(12) United States Patent
Awaka et al.

(10) Patent No.: US 7,315,879 B2
(45) Date of Patent: Jan. 1, 2008

(54) MULTIPLY-ACCUMULATE MODULES AND PARALLEL MULTIPLIERS AND METHODS OF DESIGNING MULTIPLY-ACCUMULATE MODULES AND PARALLEL MULTIPLIERS

(75) Inventors: Kaoru Awaka, Ibaraki (JP); Hiroshi Takahashi, Ibaraki (JP); Shigetoshi Muramatsu, Ibaraki (JP); Akihiro Takegama, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 515 days.

(21) Appl. No.: 09/963,480

(22) Filed: Sep. 27, 2001

(65) Prior Publication Data

US 2002/0116433 A1 Aug. 22, 2002

Related U.S. Application Data

(60) Provisional application No. 60/269,450, filed on Feb. 16, 2001.

(51) Int. Cl.
*G06F 15/00* (2006.01)
(52) U.S. Cl. .................................................... 708/603
(58) Field of Classification Search ................ 708/523, 708/620–632, 603, 490, 700–714
See application file for complete search history.

(56) References Cited

U.S. PATENT DOCUMENTS

| | | | | |
|---|---|---|---|---|
| 4,628,472 A | * | 12/1986 | Fensch | 708/627 |
| 4,718,031 A | * | 1/1988 | Nukiyama | 708/625 |
| 5,442,576 A | * | 8/1995 | Gergen et al. | 708/620 |
| 5,841,812 A | * | 11/1998 | Shepherd et al. | 375/341 |
| 6,366,061 B1 | * | 4/2002 | Carley et al. | 323/223 |
| 6,535,902 B2 | * | 3/2003 | Goto | 708/629 |
| 6,571,268 B1 | * | 5/2003 | Giacalone et al. | 708/524 |
| 6,721,774 B1 | * | 4/2004 | Lee et al. | 708/629 |
| 2001/0009012 A1 | * | 7/2001 | Itoh | 708/629 |
| 2001/0016865 A1 | * | 8/2001 | Goto | |
| 2003/0110197 A1 | * | 6/2003 | Hansen et al. | |

* cited by examiner

*Primary Examiner*—Chat C. Do
(74) *Attorney, Agent, or Firm*—Robert D. Marshall, Jr.; W. James Brady; Frederick J. Telecky, Jr.

(57) ABSTRACT

A multiply-accumulate module (100) includes a multiply-accumulate core (120), which includes a plurality of Booth encoder cells (104a). The multiply-accumulate core (120) also includes a plurality of Booth decoder cells (110a) connected to at least one of the Booth encoder cells (104a) and a plurality of Wallace tree cells (112a) connected to at least one of the Booth decoder cells (110a). Moreover, at least one first Wallace tree cell (112a1) or at least one first Booth decoder cell (110a1), or any combination thereof, includes a first plurality of transistors, and at least one second Wallace tree cell (112a2) or at least one second Booth decoder cell (110a2), or any combination thereof, includes a second plurality of transistors. In addition, at least one critical path of the multiply-accumulate module (100) includes the at least one first cell and a width of at least one of the first plurality of transistors is greater than a width of at least one of the second plurality of transistors.

6 Claims, 4 Drawing Sheets

MULTIPLY-ACCUMULATE MODULES AND PARALLEL MULTIPLIERS AND METHODS OF DESIGNING MULTIPLY-ACCUMULATE MODULES AND PARALLEL MULTIPLIERS

The present application claims priority from U.S. Provisional Patent Application No. 60/269,450, entitled "A Low Power and High performance Multiply-accumulate (MAC) Module," the disclosure of which is incorporated herein by reference in its entirety.

BACKGROUND OF THE INVENTION

1. Field of the Invention

The present invention relates generally to the field of multiply-accumulate modules and parallel multipliers. More specifically, the present invention is directed towards low power and high performance multiply-accumulate modules and parallel multipliers, and methods for designing such multiply-accumulate modules and parallel multipliers.

2. Description of Related Art

Some known multiply-accumulate modules may comprise a multiplier register, a multiplicand register, an accumulator or result register, and a multiply-accumulate core. The multiplier register may comprise a first binary number and multiplicand register may comprise a second binary number. Moreover, the multiply-accumulate core may multiply the first binary number and the second binary number, and also may add the product of the first binary number and the second binary to a third binary number initially or previously stored in the result register. The multiply-accumulate core may comprise a Booth encoder, a plurality of data processing cells, a Booth decoder, and a Wallace tree. The multiply-accumulate core also may comprise an adder circuit, and a saturation detection circuit. The multiplier register may be connected to the Booth encoder, which may be connected to the Booth decoder. The multiplicand register may be connected to each data processing cell. In addition, each data processing cell may be connected to the Booth decoder. The Booth decoder may be connected to the Wallace tree, which may be connected to the adder and the result register. Moreover, the adder may be connected to the saturation detector, which may be connected to the result register, such that the product of the first binary number and the second binary number may be added to the third binary number initially stored in the result register. This new value then may replace the initial value stored in the result register. The result register then is connected to the Wallace tree, such that a product of the subsequent first binary number and the subsequent second binary number may be added to the previous output stored in the result register, i e., the sum of the value initially stored in the result register and the product of the first binary number and the second binary number. As such, the previous output stored in the result register may be replaced by a new output from the multiply-accumulate core. Moreover, the new output from the multiply-accumulate core stored in the result register may be expressed as An=An−1+Xi*Yi, where An−1 is the output from the multiply-accumulate core previously stored in the result register, Xi*Yi is the product of the current first binary number and the current second binary number being multiplied by the multiply-accumulate core, and An is the new value stored in the result register, which replaces An−1.

In any known multiply-accumulate module, the multiply-accumulate module may have a plurality of paths. A path may be defined as an electrical route through which an electrical signal travels in order to flow from an input of the multiply-accumulate module, e.g., the multiplier register or the multiplicand register, to an output of the multiply-accumulate module, e.g., the output from the saturation detector. A number of these paths also may be a critical path. A critical path may be defined as those paths through which an amount of time that it takes for the electrical signal to travel from an input of the multiply-accumulate module to an output of the multiply-accumulate module is greater than or equal to a predetermined amount of time, in which the predetermined amount of time is less than a greatest or longest amount of time that it takes any other electrical signal to travel from an input of the multiply-accumulate module to an output of the multiply-accumulate module. For example, the number of paths in the known multiply-accumulate module which also may be critical paths may be greater than ten thousand. Moreover, in any known multiply-accumulate module, the Wallace tree may comprise a plurality of Wallace tree cells, and each of the Wallace tree cells may comprise a Wallace tree circuit, which may comprise a plurality of components, e.g., a plurality of transistors. In addition, some of the Wallace tree cells may be involved in at least one critical path of the multiply-accumulate module. For example, some of the Wallace tree cells may be involved in one critical path, and other Wallace tree cells may be involved in greater than four thousand critical paths, greater than six thousand critical paths, or greater than eight thousand critical paths. Nevertheless, some Wallace tree cells may not be involved in any critical paths. Similarly, the Booth decoder may comprise a plurality of Booth decoder cells, and each of the Booth decoder cells may comprise a Booth decoder circuit, which may comprise a plurality of components. In addition, some of the Booth decoder cells may be involved in at least one critical path of the multiply-accumulate module, and other Booth decoder cells may not be involved in any critical paths.

Nevertheless, in one known multiply-accumulate module, when a first Wallace tree cell is involved in at least one critical path, and a second Wallace tree cell is not involved in any critical paths, the Wallace tree circuit for the first Wallace tree cell may be structurally the same as the Wallace tree circuit for the second Wallace tree cell, i.e., the circuit design employed in the first Wallace tree cell may be the same as the circuit design employed in the second Wallace tree cell. Moreover, the components used to implement the Wallace tree circuit design for the first Wallace tree cell may have the same performance capabilities as the corresponding components used in the Wallace tree circuit for the second Wallace tree cell, i.e., each of the components used in the first Wallace tree cell may operate with the same speed capabilities and may be the same size as a corresponding component used in the Wallace tree circuit for the second Wallace tree cell. When a first component is of a greater size, e.g., of a greater width, than a corresponding second component, the first component may operate at a faster speed than the second component. Nevertheless, the first component also may consume more power than the second component. Similarly, in such a known multiply-accumulate module, when a first Booth decoder cell is involved in at least one critical path, and a second Booth decoder cell is not involved in any critical paths, the Booth decoder circuit for the first Booth decoder cell may be structurally the same as the Booth decoder circuit for the second Booth decoder cell. Moreover, each of the components used in the Booth decoder circuit for the first Booth decoder cell may have the same performance capabilities as their corresponding component used in the Booth decoder circuit for the second Booth decoder cell.

Another known multiply-accumulate module may be substantially similar to the above-described known multiply-accumulate module, except that two power supplies operating at two different voltages may be employed to power the cells. Specifically, each of the first cells which are involved in at least one critical path may be connected to the first power supply. Moreover, each of the second cells which are not involved any critical paths may be connected to the second power supply, which may operate at a lesser voltage than the first power supply. Using two separate power supplies may decrease an amount of power consumed by those cells not involved in any critical paths, which also may decrease an amount of power consumed by the multiply-accumulate module. Nevertheless, using two power supplies may require the use of an extra power supply line, which may increase a size of the multiply-accumulate module.

Yet another known multiply-accumulate module also may be substantially similar to the above-described known multiply-accumulate module, including the employment of a single power supply, except that the threshold voltage of the transistors employed in those cells which are not involved in any critical paths may be altered. Nevertheless, employing transistors having different threshold voltages may increase a cost of manufacturing the multiply-accumulate module. Moreover, because an amount of power consumed by a cell may not substantially depend on threshold voltage of the transistors employed in the cell, an amount of power consumed by the cell may not be substantially reduced.

SUMMARY OF THE INVENTION

Therefore, a need has arisen for multiply-accumulate modules and parallel multipliers that overcome these and other shortcomings of the related art. A technical advantage of the present invention is that the width of at least one transistor employed in at least one Wallace tree cell not involved in any critical paths may be reduced, which may reduce an amount of power consumed by the multiply-accumulate module or the parallel multiplier. Another technical advantage of the present invention is that the width of at least one transistor employed in at least one Booth decoder cell not involved in any critical paths may be reduced, which may reduce an amount of power consumed by the multiply-accumulate module or the parallel multiplier. Yet another technical advantage of the present invention is that an amount of power consumed by cells not involved in any critical paths may be reduced, which may reduce an amount of power consumed by the multiply-accumulate module, without employing two separate power supplies for the cells.

According to an embodiment of the present invention, a multiply-accumulate module is described. The multiply-accumulate module comprises a multiply-accumulate core, which comprises a plurality of Booth encoder cells, and a plurality of Booth decoder cells connected to at least one of the Booth encoder cells. The multiply-accumulate module also comprises a plurality of Wallace tree cells connected to at least one of the Booth decoder cell, in which at least one first Wallace tree cell or at least one first Booth decoder cell, or any combination thereof, comprises a first plurality of transistors. Moreover, at least one second Wallace tree cell or at least one second Booth decoder cell, or any combinations thereof, comprises a second plurality of transistors. In addition, at least one critical path of the multiply-accumulate module comprises the at least one first cell, and a width of at least one of the first plurality of transistors is greater than a width of at least one of the second plurality of transistors.

According to another embodiment of the present invention, a parallel multiplier is described. The parallel multiplier comprises a parallel multiplier core, which comprises a plurality of Booth encoder cells, and a plurality of Booth decoder cells connected to at least one of the Booth encoder cells. The parallel multiplier also comprises a plurality of Wallace tree cells connected to at least one of the Booth decoder cells, in which at least one first Wallace tree cell or at least one first Booth decoder cell, or any combination thereof, comprises a first plurality of transistors. Moreover, at least one second Wallace tree cell or at least one second Booth decoder cell, or any combinations thereof, comprises a second plurality of transistors. In addition, at least one critical path of the parallel multiplier comprises the at least one first cell, and a width of at least one of the first plurality of transistors is greater than a width of at least one of the second plurality of transistors.

According to yet another embodiment of the present invention, a method of designing a multiply-accumulate module is described. The method comprises the step of providing a multiply-accumulate core, which comprises the steps of providing a plurality of Booth encoder cells, and connecting a plurality of Booth decoder cells to at least one of the Booth encoder cells. Providing the multiply-accumulate core also comprises the step of connecting a plurality of Wallace tree cells to at least one of the Booth decoder cells. Moreover, in this embodiment, at least one first Wallace tree cell or at least one first Booth decoder cell, or any combination thereof, comprises a first plurality of transistors. In addition, at least one second Wallace tree cell or at least one second Booth decoder cell, or any combinations thereof, comprises a second plurality of transistors, and at least one critical path of the multiply-accumulate module comprises the at least one first cell. The method further comprises the steps of selecting a first width for at least one of the first plurality of transistors, and selecting a second width for at least one of the second plurality of transistors, which is less than the first width.

According to still another embodiment of the present invention, a method of designing a parallel multiplier is described. The method comprises the step of providing a parallel multiplier core, which comprises the steps of providing a plurality of Booth encoder cells, and connecting a plurality of Booth decoder cells to at least one of the Booth encoder cells. Providing the parallel multiplier core also comprises the step of connecting a plurality of Wallace tree cells to at least one of the Booth decoder cells. Moreover, in this embodiment, at least one first Wallace tree cell or at least one first Booth decoder cell, or any combination thereof, comprises a first plurality of transistors. In addition, at least one second Wallace tree cell or at least one second Booth decoder cell, or any combinations thereof, comprises a second plurality of transistors, and at least one critical path of the parallel multiplier comprises the at least one first cell. The method further comprises the steps of selecting a first width for at least one of the first plurality of transistors, and selecting a second width for at least one of the second plurality of transistors, which is less than the first width.

Other features and advantages will be apparent to persons of ordinary skill in the art in view of the following detailed description of the invention and the accompanying drawings.

BRIEF DESCRIPTION OF THE DRAWINGS

For a more complete understanding of the present invention, needs satisfied thereby, and the features and advantages thereof, reference now is made to the following descriptions taken in connection with the accompanying drawings.

DETAILED DESCRIPTION OF PREFERRED EMBODIMENTS

Preferred embodiments of the present invention and their advantages may be understood by referring to FIGS. 1-4, like numerals being used for like corresponding parts in the various drawings.

Figure 1:
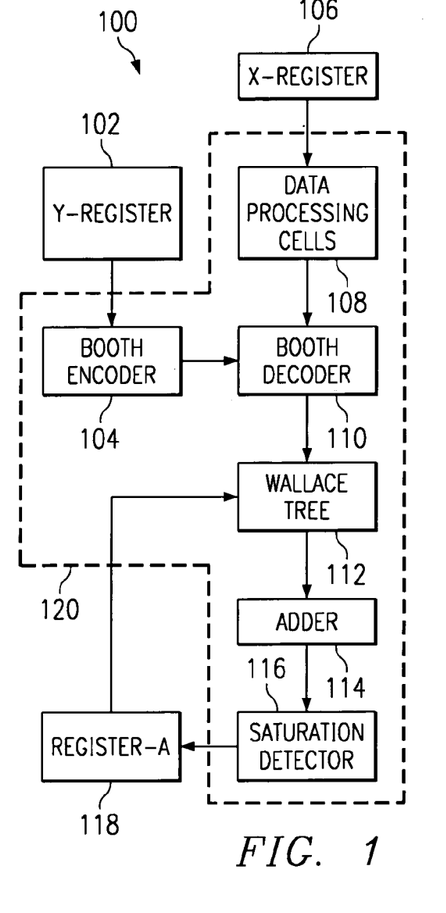
FIG. 1 is a flow chart of a multiply-accumulate module according to an embodiment of the present invention.

Referring to FIG. 1, a flow chart of a multiply-accumulate module 100 according to an embodiment of the present invention is described. Multiply-accumulate module 100 may comprise a multiplier register 102, a multiplicand register 106, a result register 118, and a multiply-accumulate core 120. Multiplier register 102 may comprise a first binary number and multiplicand register 106 may comprise a second binary number. For example, the first binary number may be a 17 bit number and the second binary number also may be a 17 bit number. Moreover, multiply-accumulate core 120 may multiply the first binary number and the second binary number and add the product of the first and second binary numbers to a third binary number initially or previously stored in result register 118. Multiply-accumulate core 120 may comprise a Booth encoder 104 having any known Booth encoder structure, e.g., having any known Booth encoder circuit design, a plurality of data processing cells 108, a Booth decoder 110 having any known Booth decoder structure, and a Wallace tree 112 having any known Wallace tree structure. Multiply-accumulate core 120 further may comprise any known adder circuit 114 and any known saturation detection circuit 116. The possible structures of such known Booth encoders; Booth decoders; Wallace trees; adders; and saturation detectors, respectively, will be readily understood by those of ordinary skill in the art. Moreover, those of ordinary skill in the art will understand that multiply-accumulate module 100 may employ any known Booth encoder structure; Booth decoder structure; Wallace tree structure; adder; and saturation detector, respectively. Therefore, such structures will not be discussed in detail.

Multiplier register 102 may be connected to Booth encoder 104, which comprise a plurality of Booth encoder cells 104a and may be connected to Booth decoder 110. Multiplicand register 106 may be connected to each data processing cell 108. In addition, each data processing cell 108 may be connected to Booth decoder 110. Booth decoder 110 may be connected to Wallace tree 112, which may be connected to adder 114 and result register 118. Moreover, adder 114 may be connected to saturation detector 116, which may be connected to result register 118, such that the product of the first binary number and the second binary number may be added to the third binary number initially stored in result register 118. This new value then may replace the initial value stored in result register 118.

Result register 118 further may be connected to Wallace tree 112, such that a product of a subsequent first binary number and a subsequent second binary number may be added to the previous output stored in result register 118, i.e., the sum of the value initially stored in result register 118 and the product of the first binary number and the second binary number. As such, the previous output stored in result register 118 may be replaced by a new output from multiply-accumulate core 120. Moreover, the new output from multiply-accumulate core 120 stored in result register 118 may be expressed as An=An−1+Xi*Yi, where An−1 is the output from multiply-accumulate core 120 previously stored in result register 118, Xi*Yi is the product of the current first binary number and the current second binary number being multiplied by multiply-accumulate core 120, and An is the new value stored in result register 118, which replaces An−1.

Figure 2:
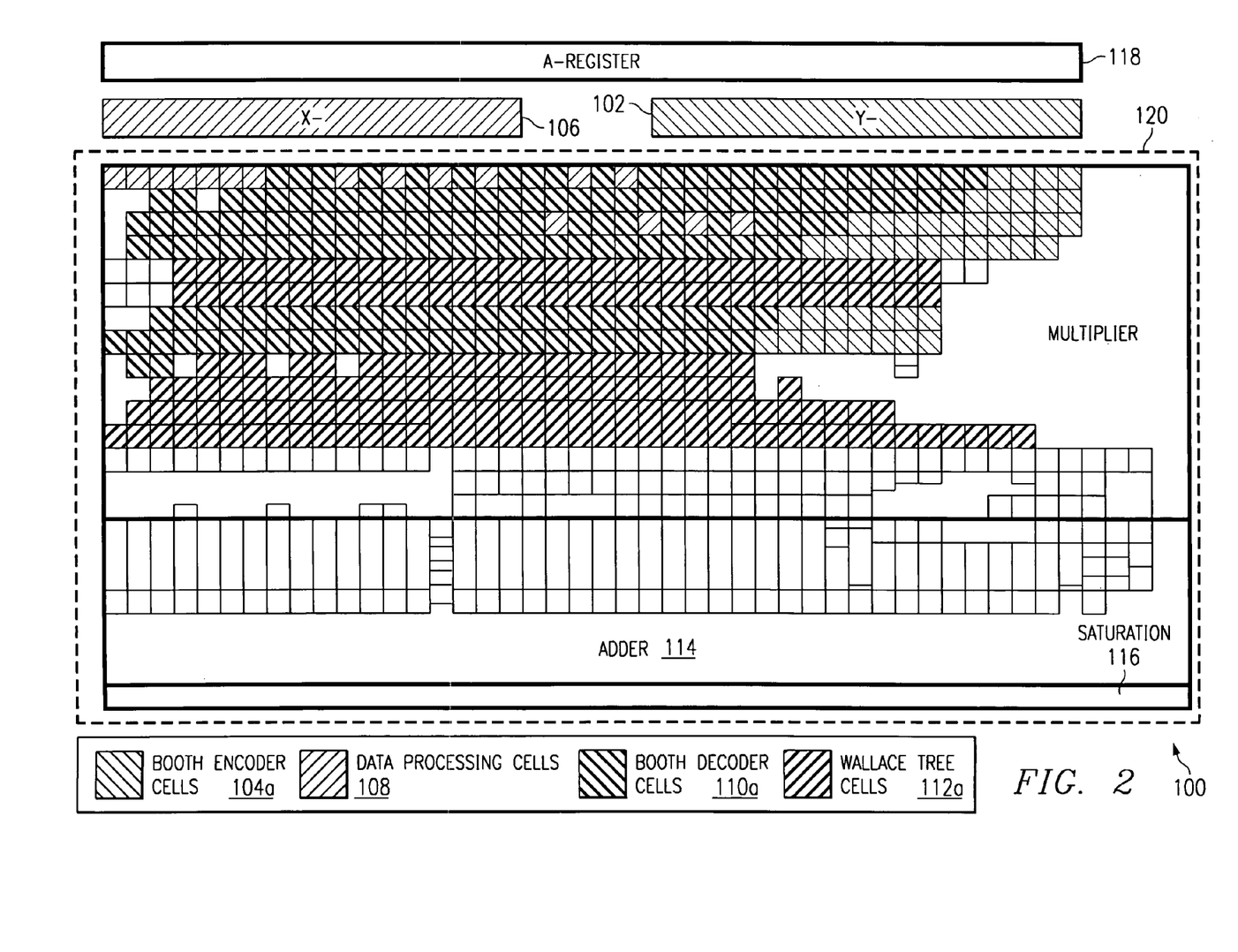
FIG. 2 is an exemplary placement schematic of the multiply-accumulate module of FIG. 1 according to an embodiment of the present invention.

Referring to FIG. 2, an exemplary placement schematic of multiply-accumulate module 100 employing the flow chart shown in FIG. 1, according to an embodiment of the present invention, is described. Nevertheless, it will be understood by those of ordinary skill in the art that the present invention may be employed with any known placement of elements within a multiply-accumulate module. In multiply-accumulate module 100, result register 118 may be positioned at an input side of multiply-accumulate core 120, such that result register 118 may be connected to Wallace tree 112. Moreover, multiplier register 102 also may be positioned at the input side of multiply-accumulate core 120, such that multiplier register 102 may be connected to Booth encoder 104. In one embodiment, multiplier register 102 may be positioned between result register 118 and the input side of multiply-accumulate core 120. Similarly, multiplicand register 106 may be positioned at the input side of multiply-accumulate core 120, such that multiplicand register 106 may be connected to data processing cells 108. Multiplicand register 106 also may be positioned between result register 118 and the input side of multiply-accumulate core 120. In one embodiment, multiplier register 102 and multiplicand register 106 both may be positioned at the input side of multiply-accumulate core 120 and further may be positioned between result register 118 and the input side of multiply-accumulate core 120. In this embodiment, multiplicand register 106 may be positioned adjacent to multiplier register 102.

In addition, within multiply-accumulate core 120, a first portion of Booth decoder 110, a first portion of Booth encoder 104, and at least one data processing cell 108 may be positioned at a top portion of multiply-accumulate core 120, i.e., at an input portion of multiply-accumulate core 120. In one embodiment, each data processing cell 108 may be positioned at the input portion of multiply-accumulate core 120. A first portion of Wallace tree 112 may be positioned at an output side of the first portion of Booth decoder 110, an output side of the first portion Booth encoder 104, and an output side of each data processing cell 108. As such, at least one data processing cell 108 may be positioned at an input side of at least a portion of Wallace tree 112. A second portion of Booth decoder 110 and a second portion Booth encoder 104 may be positioned at an output side of the first portion of Wallace tree 112. Moreover, a second portion of Wallace tree 112 may be positioned at an output side of the second portion of Booth decoder 110 and an output side of the second portion Booth encoder 104. Further, adder 114 may be positioned at an output side of the second portion of Wallace tree 112, and saturation detector 116 may be positioned at an output side of adder 114, such that saturation detector 116 may be connected to result register 118. Moreover, the output from saturation detector 116 may be the output of multiply-accumulate core 120.

When multiplier register 102 is positioned at the input side of multiply-accumulate core 120 and connected to Booth encoder 104, wires from multiplier register 102 may not pass over either adder 114 or saturation detector 116. Similarly, when multiplicand register 106 is positioned at the input side of multiply-accumulate core 120 and connected to data processing cells 108, wires from multiplicand register 106 may not pass over either adder 114 and saturation detector 116. Moreover, in each of the above described embodiments of the present invention, a wire density at the first portion of Wallace tree 112 may be substantially less then the wire density at the top portion of the Wallace tree of a known multiplier of a known multiply-accumulate module. Moreover, reducing the length and the number of wires used in a multiply-accumulate module may reduce a capacitance of the multiply-accumulate module. An amount of power consumed by a multiply-accumulate module may be expressed by the formula $P_{consumed} = \alpha * C * V^2 * f$, where $P_{consumed}$ is an amount of power consumed by the multiply-accumulate module, $\alpha$ is the switching probability, C is the capacitance of the multiply-accumulate module, V is a supply voltage, and f is an operation frequency of the multiply-accumulate module. Consequently, reducing the capacitance of the multiply-accumulate module also may reduce the amount of power consumed by the multiply-accumulate module.

Figure 3:
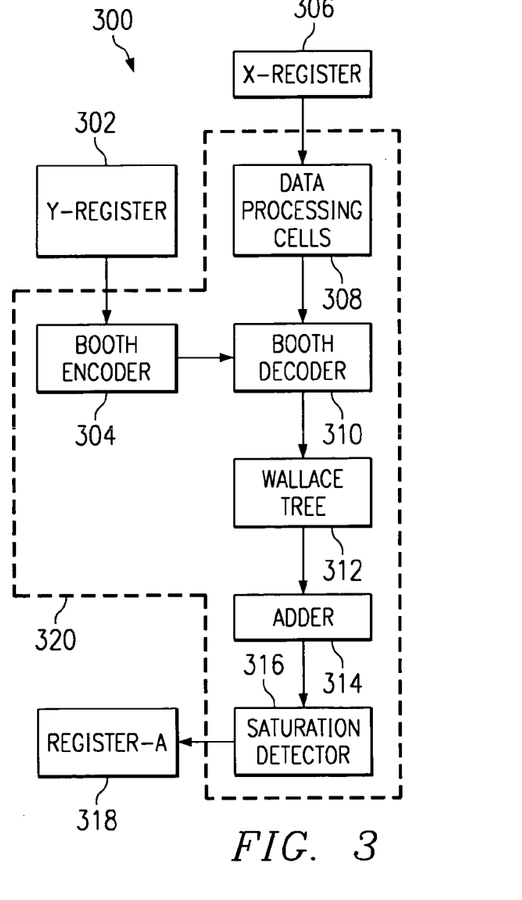
FIG. 3 is a flow chart of a parallel multiplier according to an embodiment of the present invention.

Referring to FIG. 3, a flow chart of a parallel multiplier 300 according to an embodiment of the present invention is described. Parallel multiplier 300 may comprise a multiplier register 302, a multiplicand register 306, a result register 318, and a parallel multiplier core 320. Multiplier register 302 may comprise a first binary number and multiplicand register 306 may comprise a second binary number. For example, the first binary number may be a 17 bit number and the second binary number also may be a 17 bit number. Moreover, parallel multiplier core 320 may multiply the first binary number and the second binary number. Parallel multiplier core 320 may comprise a Booth encoder 304 having any known Booth encoder structure, e.g., having any known Booth encoder circuit design, a plurality of data processing cells 308, a Booth decoder 310 having any known Booth decoder structure, and a Wallace tree 312 having any known Wallace tree structure. Parallel multiplier core 320 further may comprise any known adder circuit 314 and any known saturation detection circuit 316. The possible structures of such known Booth encoders; Booth decoders; Wallace trees; adders; and saturation detectors, respectively, will be readily understood by those of ordinary skill in the art. Moreover, those of ordinary skill in the art will understand that parallel multiplier 300 may employ any known Booth encoder structure; Booth decoder structure; Wallace tree structure; adder; and saturation detector, respectively. Therefore, such structures will not be discussed in detail.

Multiplier register 302 may be connected to Booth encoder 304, which may be connected to Booth decoder 310. Multiplicand register 306 may be connected to each data processing cell 308. In addition, each data processing cell 308 may be connected to Booth decoder 310. Booth decoder 310 may be connected to Wallace tree 312, which may be connected to adder 314, such that parallel multiplier core 320 may multiply the first binary number and the second binary number. Moreover, adder 314 may be connected to saturation detector 316, which may be connected to result register 318, such that the product of the first binary number and the second binary number may be stored in result register 318.

Moreover, in parallel multiplier 300, result register 318 may be positioned at an input side of parallel multiplier core 320. Multiplier register 302 also may be positioned at the input side of parallel multiplier core 320, such that multiplier register 302 may be connected to Booth encoder 304. In one embodiment, multiplier register 302 may be positioned between result register 318 and the input side of parallel multiplier core 320. Similarly, multiplicand register 306 may be positioned at the input side of parallel multiplier core 320, such that multiplicand register 306 may be connected to data processing cells 308. Multiplicand register 306 also may be positioned between result register 318 and the input side of parallel multiplier core 320. In one embodiment, multiplier register 302 and multiplicand register 306 both may be positioned at the input side of parallel multiplier core 320 and further may be positioned between result register 318 and the input side of parallel multiplier core 320. In this embodiment, multiplicand register 306 may be positioned adjacent to multiplier register 302.

In addition, within parallel multiplier core 320, a first portion of Booth decoder 310, a first portion Booth encoder 304, and at least one data processing cell 308 may be positioned at a top portion of parallel multiplier core 320, i.e., at an input portion of parallel multiplier core 320. In one embodiment, each data processing cell 308 may be positioned at the input portion of parallel multiplier core 320. A first portion of Wallace tree 312 may be positioned at an output side of the first portion of Booth decoder 310, an output side of the first portion of Booth encoder 304, and an output side of each data processing cell 308. As such, at least one data processing cell 308 may be positioned at an input side of at least a portion of Wallace tree 312. A second portion of Booth decoder 310 and a second portion Booth encoder 304 may be positioned at an output side of the first portion of Wallace tree 312. Moreover, a second portion of Wallace tree 312 may be positioned at an output side of the second portion of Booth decoder 310 and an output side of the second portion of Booth encoder 304. Further, adder 314 may be positioned at an output side of the second portion of Wallace tree 312, and saturation detector 316 may be positioned at an output side of adder 314, such that saturation detector 316 may be connected to result register 318. Moreover, the output from saturation detector 316 may be the output of parallel multiplier core 320.

When multiplier register 302 is positioned at the input side of parallel multiplier core 320 and connected to Booth encoder 304, wires from multiplier register 302 may not pass over either adder 314 or saturation detector 316. Similarly, when multiplicand register 306 is positioned at the input side of parallel multiplier core 320 and connected to data processing cells 308, wires from multiplicand register 306 may not pass over either adder 314 and saturation detector 316. Moreover, in each of the above described embodiments of the present invention, a wire density at the first portion of Wallace tree 312 may be substantially less than the wire density at the top portion of the Wallace tree of a known parallel multiplier core of a known parallel multiplier. Moreover, reducing the length and the number of wires used in a parallel multiplier may reduce a capacitance of the parallel multiplier. An amount of power consumed by a parallel multiplier may be expressed by the formula $P_{consumed} = \alpha * C * V^2 * f$, where $P_{consumed}$ is an amount of power consumed by the parallel multiplier, $\alpha$ is the switching probability, C is the capacitance of the parallel multiplier, V is a supply voltage, and f is an operation frequency of the parallel multiplier. Consequently, reducing the capacitance of the parallel multiplier also may reduce the amount of power consumed by the parallel multiplier. Nevertheless, it will be understood by those of ordinary skill in the art that the present invention may be employed with any known placement of elements within parallel multiplier 300.

Figure 4:
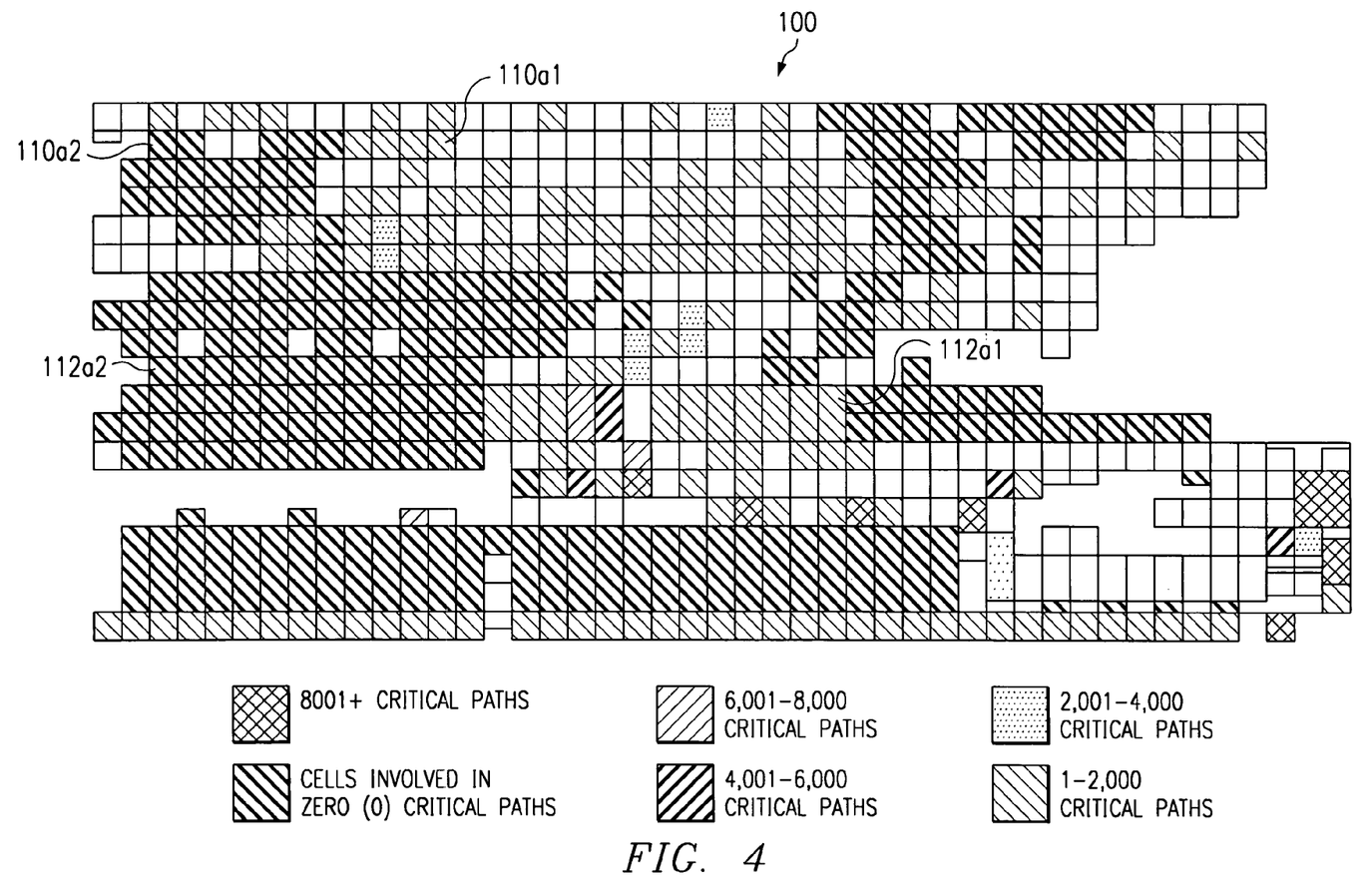
FIG. 4 is a reduced power cell placement schematic of the multiply-accumulate module of FIG. 1 according to an embodiment of the present invention.

Referring to FIG. 4, in any of the above-described embodiments of the present invention, multiply-accumulate module 100 or parallel multiplier 300, or both, may have a plurality of paths. A path may be defined as an electrical route through which an electrical signal travels in order to flow from an input of multiply-accumulate module 100 or parallel multiplier 300, e.g., the multiplier register or the multiplicand register, to an output of multiply-accumulate module 100 or parallel multiplier 300, e.g., the output from the saturation detector, respectively. A number of these paths also may be a critical path. A critical path may be defined as those paths through which an amount of time that it takes for the electrical signal to travel from an input of multiply-accumulate module 100 or parallel multiplier 300 to an output of multiply-accumulate module 100 or parallel multiplier 300, respectively, is greater than or equal to a predetermined amount of time, in which the predetermined amount of time is less than a greatest or a longest amount of time that it takes any other electrical signal to travel from an input of multiply-accumulate module 100 or parallel multiplier 300 to an output of multiply-accumulate module 100 or parallel multiplier 300, respectively.

Figure 5:
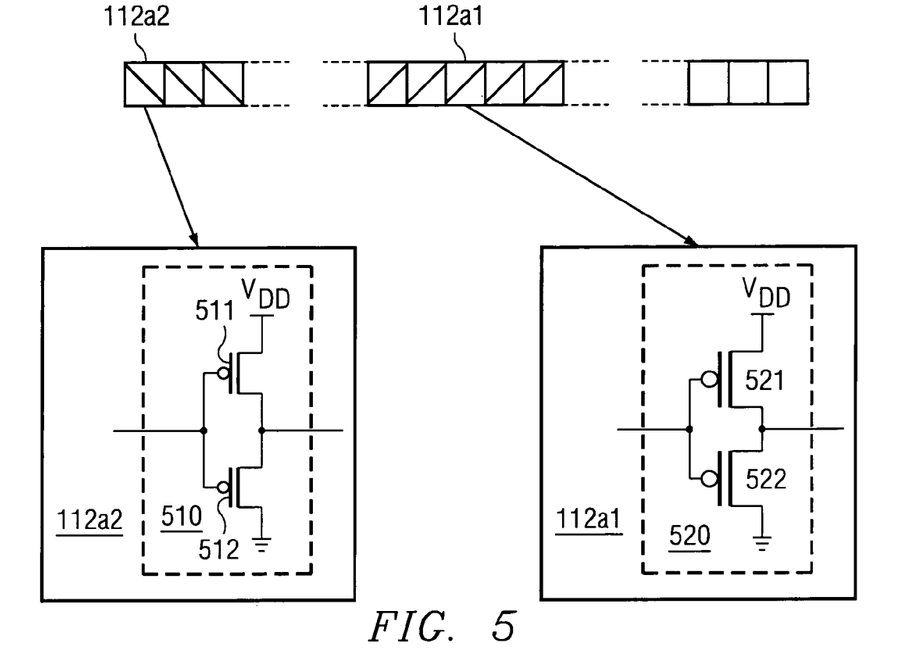
FIG. 5 illustrates the difference in transistor width between first Wallace tree cells and second Wallace tree cells.

For example as illustrated in FIG. 5, Wallace tree 112 may comprise a plurality of Wallace tree cells 112a and Wallace tree 312 may comprise a plurality of Wallace tree cells (not shown). Some Wallace tree cells 112a, such as a plurality of first Wallace tree cells 112a1, may be included within at least one critical path of multiply-accumulate module 100, i.e., at least one critical path of multiply-accumulate module 100 may comprise at least one first Wallace tree cell 112a1. Nevertheless, other Wallace tree cells 112a, such as a plurality of second Wallace tree cell 112a2, may not be included in any critical paths of multiply-accumulate module 100, i.e., none of critical of the critical paths of multiply-accumulate module 100 may comprise any second Wallace tree cell 112a2. Moreover, each first Wallace tree cell 112a1 may comprise a first Wallace tree circuit 520, which may comprise a first plurality of components, such as a first plurality of transistors 521 and 522. Similarly, each second Wallace tree cell 112a2 may comprise a second Wallace tree circuit 510, which may comprise a second plurality of components, such as a second plurality of transistors 511 and 512. Nevertheless, in this embodiment, although the second Wallace tree circuit may be structurally the same as the first Wallace tree circuit, a width of at least one of the second plurality of transistors 511 and 512 may be less than a width of at least one of the first plurality of transistors 521 and 522. Specifically, the width of at least one of the second plurality of transistors 511 and 512 may be less than the width of its corresponding first transistor 521 and 522. Decreasing the width of at least one of the second plurality of transistors 511 and 512 relative to the width of at least one of the first plurality of transistors 521 and 522 may increase an amount of time that it takes for the electrical signal to travel through at least one second Wallace tree cell 112a2 relative to an amount of time that it takes for the electrical signal to travel through at least one first Wallace tree cell 112a1. Nevertheless, decreasing the width of at least one of the second plurality of transistors 511 and 512 relative to the width of at least one of the first plurality of transistors 521 and 522 also may decrease an amount of power consumed by at least one second Wallace tree cell 112a2 relative to an amount of power consumed by at least one first Wallace tree cell 112a1. Consequently, the width of at least one of the second plurality of transistors 511 and 512 may be selected such that the amount of time that it takes for the electrical signal to travel than or equal to the amount of time that it takes the electrical signal to travel through at least one first Wallace tree cell 112a1. Moreover, decreasing the amount of power consumed by at least one second Wallace tree cell 112a2 also may decrease an amount of power consumed by multiply-accumulate module 100.

In an alternative embodiment of the present invention, the width of each of the second plurality of transistors 511 and 512 of at least one second Wallace tree cell 112a2 may be less than the width of each of the first plurality of transistors 521 and 522 of at least one first Wallace tree cell 112a1. In yet another embodiment, the width of each of the second plurality of transistors 511 and 512 of each second Wallace tree cell 112a2 may be less than the width of each of the first plurality of transistors 521 and 522 of each first Wallace tree cell 112a1. Moreover, in any of the above described embodiments, each first Wallace tree cell 112a1 and each second Wallace tree cell 112a2 may be powered by the same power supply (not shown). In addition, in any of the above-described embodiments, a least significant bit of Wallace tree 112 or a most significant bit of Wallace tree 112, or both, which may be positioned at a first end portion and a second end portion of Wallace tree 112, respectively, may be a second Wallace tree cell 112a2. Similarly, in this embodiment, the least significant bit of Wallace tree 112 or the most significant bit of Wallace tree 112, or both, may not be a first Wallace tree cell 112a1, such that each first Wallace tree cell 112a1 may be positioned between second Wallace tree cells 112a2. Moreover, it will be understood by those of ordinary skill in the art that any of the above-described embodiments of the present invention may be applied to parallel multiplier 300.

Figure 6:
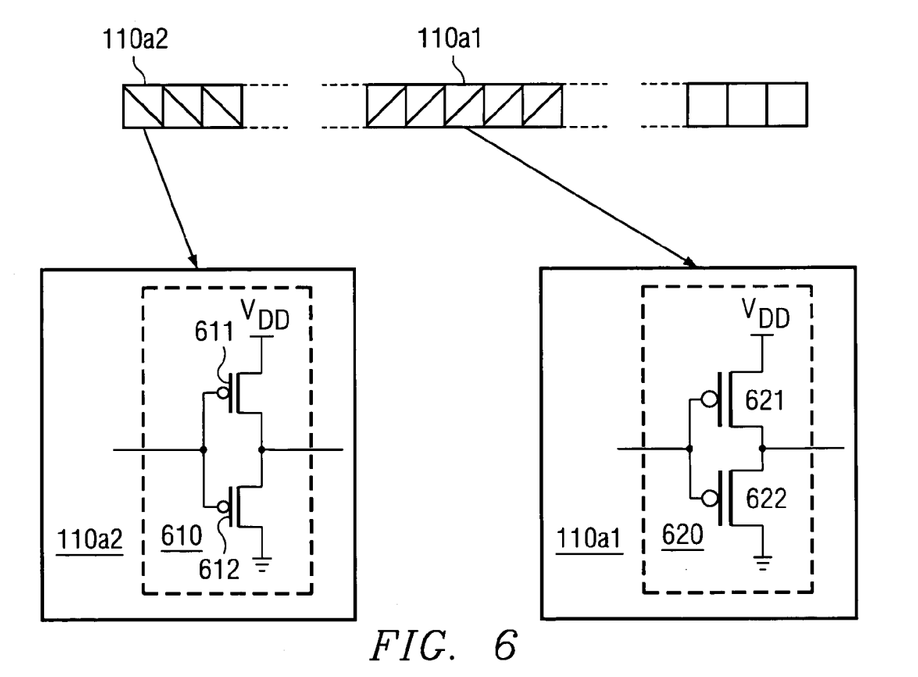
FIG. 6 illustrates the difference in transistor width between first Booth decoder cells and second Booth decoder cells.

Similarly as illustrated in FIG. 6, Booth decoder 110 may comprise a plurality of Booth decoder cells 110a and Booth decoder 310 may comprise a plurality of Booth decoder cells (not shown). Some Booth decoder cells 110a, such as a plurality of first Booth decoder cells 110a1, may be included within at least one critical path of multiply-accumulate module 100, i.e., at least one critical path of multiply-accumulate module 100 may comprise at least one first Booth decoder cell 110a1. Nevertheless, other Booth decoder cells 110a, such as a plurality of second Booth decoder cell 110a2, may not be included in any critical paths of multiply-accumulate module 100, i.e., none of the critical paths of multiply-accumulate module 100 may comprise any second Booth decoder cell 110a2. Moreover, each first Booth decoder cell 110a1 may comprise a first plurality of components, such as a first plurality of transistors 621 and 622. Similarly, each second Booth decoder cell 110a2 may comprise a second Booth decoder circuit 610, which may comprise a second plurality of components, such as a second plurality of transistors 611 and 612. Nevertheless, in this embodiment, although the second Booth decoder circuit 610 may be structurally the same as the first Booth decoder circuit 620, a width of at least one of the second plurality of transistors 611 and 612 may be less than a width of at least one of the first plurality of transistors 621 and 622. Specifically, the width of at least one of the second plurality of transistors 611 and 612 may be less than the width of its corresponding first transistor 621 and 622. Decreasing the width of at least one of the second plurality of transistors 611 and 612 relative to the width of at least one of the first plurality of transistors 621 and 622 may increase an amount of time that it takes for the electrical signal to travel through at least one second Booth decoder cell 110a2 relative to an amount of time that it takes for the electrical signal to travel through at least one second Booth decoder cell 11a2 relative to an amount of time that it takes for the electrical signal to travel through at least one first Booth decoder cell 110a1. Nevertheless, decreasing the width of at least one of the second plurality of transistors 611 and 612 relative to the width of at least one of the first plurality of transistors 621 and 622 also may decrease an amount of power consumed by at least one second Booth decoder cell 110a2 relative to an amount of power consumed by at least one first Booth decoder cell 110a1. Consequently, the width of at least one of the second plurality of transistors 611 and 612 may be selected such that the amount of time that it takes for the electrical signal to travel through at least one second Booth decoder cell 110a2 may be less than or equal to the amount of time that it take the electrical signal to travel through at least one first Booth decoder cell 110a1. Moreover, decreasing the amount of power consumed by at least one second Booth decoder cell 110a2 also may decrease an amount to power consumed by multiply-accumulate module 100.

In an alternative embodiment of the present invention, the width of each of the second plurality of transistors 611 and 612 of at least one second Booth decoder cell 110a2 may be less than the width of each of the first plurality of transistors 621 and 622 of at least one first Booth decoder cell 110a1. In yet another embodiment, the width of each of the second plurality of transistors 611 and 612 of each second Booth decoder cell 110a2 may be less than the width of each of the first plurality of transistors 621 and 622 of each first Booth decoder cell 110a1. Moreover, in any of the above described embodiments, each first Booth decoder cell 110a1 and each second Booth decoder cell 110a2 may be powered by the same power supply (not shown). In addition, in any of the above-described embodiments, a least significant bit of Booth decoder 110 or a most significant bit of Booth decoder 110, or both, which may be positioned at a first end portion and a second end portion of Booth decoder 110, respectively, may be a second Booth decoder cell 110a2. Similarly, in this embodiment, the least significant bit of Booth decoder 110 or the most significant bit of Booth decoder 110, or both, may not be a first Booth decoder cell 110a1, such that each first Booth decoder cell 110a1 may be positioned between second Booth decoder cells 110a2. Moreover, it will be understood by those of ordinary skill in the art that each of the above-described embodiments of the present invention may be used in combination with any other embodiment or embodiments of the present invention, and also may be applied to parallel multiplier 300.

In another embodiment of the present invention, a method of designing a multiply-accumulate module 100 may comprise the step of providing a multiply-accumulate core 120, which may comprise the steps of providing a plurality of Booth encoder cells 104a, and connecting a plurality of Booth decoder cells 110a to at least one Booth encoder cell 104a. Providing multiply-accumulate core 120 also may comprise the step of connecting a plurality of Wallace tree cells 112a to at least one Booth decoder cell 110a. Moreover, in this embodiment, at least one first cell, which may be at least one first Wallace tree cell 112a1 or at least one first Booth decoder cell 110a1, or any combination thereof, may comprise a first plurality of transistors (521 and 522, or 621 and 622). In addition, at least one second cell, which may be at least one second Wallace tree cell 112a2 or at least one second Booth decoder cell 110a2, or any combination thereof, may comprise a second plurality of transistors (511 and 512, or 611 and 612). Moreover, at least one critical path of multiply-accumulate module 100 may comprise the at least one first cell. The method further may comprise the steps of selecting a first width for at least one of the first plurality of transistors (521 and 522, or 621 and 622), and selecting a second width for at least one of the second plurality of transistors (511 and 512, or 611 and 612), which is less than the first width. Specifically, the width of at least one of the second plurality of transistors (511 and 512, or 611 and 612) may be selected such that an amount of time that it takes for an electrical signal to travel through the at least one second cell may be less than or equal to an amount of time that it takes the electrical signal to travel through the at least one first cell.

In yet another embodiment of the present invention, a method of designing a parallel multiplier may comprise the step of providing a parallel multiplier core 320, which may comprise the steps of providing a plurality of Booth encoder cells (not shown), and connecting a plurality of Booth decoder cells (not shown) to at least one Booth encoder cell (not shown). Providing parallel multiplier core 320 also may comprise the step of connecting a plurality of Wallace tree cells (not shown) to at least one Booth decoder cell (not shown). Moreover, in this embodiment, at least one first cell, which may be at least one first Wallace tree cell (not shown) or at least one second Booth decoder cell (not shown), or any combination thereof, may comprise a second plurality of transistors (521 and 522, or 621 and 622). In addition, at least one second cell, which may be at least one second Wallace tree (not shown) or at least one second Booth decoder cell (not shown), or any combination thereof, may comprise a second plurality of transistors (511 and 512, or 611 and 612). Moreover at least one critical path of multiply-accumulate module 300 may comprise the at least one first cell. The method further may comprise the steps of selecting a first width for at least one of the first plurality of transistors (521 and 522, or 621 and 622), and selecting a second width for at least one of the second plurality of transistors (511 and 512, or 611 and 612), which is less than the first width. Specifically, the width of at least one of the second plurality of transistors (511 and 512, or 611 and 612) may be selected such that an amount of time that it takes for an electrical signal to travel through the at least one second cell may be less than or equal to an amount of time that it takes the electrical signal to travel through the at least one first cell.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What we claim is:

1. A multiply-accumulate module comprising:
   a multiply-accumulate core, wherein said multiply-accumulate core comprises:
   a plurality of Booth encoder cells;
   a plurality of Booth decoder cells connected to at least one of said Booth encoder cells; and a plurality of Wallace tree cells connected to at least one of said Booth decoder cells;

wherein said multiply-accumulate module includes a plurality of electrical paths which further include at least one critical path, said at least one critical path being an electrical path for which an amount of time that it takes for an electrical signal to travel from an input of said multiply-accumulate core to an output of said multiply-accumulate core is greater than or equal to a predetermined amount of time and less than a longest amount of time that it takes any other electrical signal to travel from said input of said multiply-accumulate core to said output of said multiply-accumulate core, wherein said predetermined amount of time is less than said longest amount of time;

said plurality of Booth decoder cells includes at least one first Booth decoder cell and at least one second Booth decoder cell, each of said at least one first Booth decoder cell structurally the same as each of said at least one second Booth decoder cells except that at least one of a first plurality of transistors of said first Booth decoder cell is constructed to have a width greater than a width of a corresponding one of a second plurality of transistors of said second Booth decoder cell;

said plurality of Wallace tree cells including at least one first Wallace tree cell and at least one second Wallace tree cell, each of said at least one first Wallace tree cell structurally the same as each of said at least one second Wallace tree cell except that at least one of a first plurality of transistors of said first Wallace tree cell is constructed to have a width greater than a width of a corresponding one a second plurality of transistors of said second Wallace tree cell;

wherein said at least one first Wallace tree cell and said at least one first Booth decoder cell are disposed on said at least one critical path; and wherein said at least one second Wallace tree cell and said at least one second Booth decoder cell are disposed on an electrical path not said at least one critical path and are not disposed on any of said at least one critical path.

2. The multiply-accumulate module of claim 1, wherein said multiply-accumulate core further comprises:
an adder connected to at least one of said Wallace tree cells;
a saturation detector connected to said adder, wherein said multiply-accumulate module further comprises:
at least one input register connected to at least one of said Booth encoding cells; and
at least one result register connected to said saturation detector.

3. A parallel multiplier comprising:
a parallel multiplier core, wherein said parallel multiplier core comprises:
a plurality of Booth encoder cells;
a plurality of Booth decoder cells connected to at least one of said Booth encoder cells; and
a plurality of Wallace tree cells connected to at least one of said Booth decoder cells;

wherein said parallel multiplier includes a plurality of electrical paths which further include at least one critical path, said at least one critical path being an electrical path for which an amount of time that it takes for an electrical signal to travel from an input of said parallel multiplier core to an output of said parallel multiplier core is greater than or equal to a predetermined amount of time and less than a longest amount of time that it takes any other electrical signal to travel from said input of said parallel multiplier core to said output of said parallel multiplier core, wherein said predetermined amount of time is less than said longest amount of time;

said plurality of Booth decoder cells includes at least one first Booth decoder cell and at least one second Booth decoder cell, each of said at least one first Booth decoder cell structurally the same as each of said at least one second Booth decoder cells except that at least one of a first plurality of transistors of said first Booth decoder cell is constructed to have a width greater than a width of a corresponding one of a second plurality of transistors of said second Booth decoder cell;

said plurality of Wallace tree cells including at least one first Wallace tree cell and at least one second Wallace tree cell, each of said at least one first Wallace tree cell structurally the same as each of said at least one second Wallace tree cell except that at least one of a first plurality of transistors of said first Wallace tree cell is constructed to have a width greater than a width of a corresponding one a second plurality of transistors of said second Wallace tree cell;

wherein said at least one first Wallace tree cell and said at least one first Booth decoder cell are disposed on said at least one critical path; and wherein said at least one second Wallace tree cell and said at least one second Booth decoder cell are disposed on an electrical path not said at least one critical path and are not disposed on any of said at least one critical path.

4. The parallel multiplier of claim 3, wherein said parallel multiplier core further comprises:
an adder connected to at least one of said Wallace tree cells;
a saturation detector connected to said adder, wherein said parallel multiplier further comprises:
at least one input register connected to at least one of said Booth encoding cells; and
at least one result register connected to said saturation detector and at least one of said Wallace tree cells.

5. A method of designing a multiply-accumulate module comprising the steps of:
providing a multiply-accumulate core, wherein the step of providing a multiply-accumulate core comprises the steps of:
providing a plurality of Booth encoder cells;
connecting a plurality of Booth decoder cells to at least one of said Booth encoder cells;
connecting a plurality of Wallace tree cells to at least one of said Booth decoder cells;
defining a predetermined amount of time greater than zero and less than a longest amount of time that it takes any electrical signal to travel from said input of said multiply-accumulate core to said output of said multiply-accumulate core;
defining at least one critical path within said multiply-accumulate module, said at least one critical path being an electrical path for which an amount of time that it takes for an electrical signal to travel from an input of said multiply-accumulate core to an output of said multiply-accumulate core is greater than or equal to said predetermined amount of time and less than said longest amount of time;
defining a first Wallace tree cell and a second Wallace tree cell, each of said first Wallace tree cell structurally the same as each of said second Wallace tree cell except that at least one of a first plurality of transistors of said first Wallace tree cell is constructed to have a width greater than a width of a corresponding one a second plurality of transistors of said second Wallace tree cell;

defining a first Booth decoder cell and a second Booth decoder cell, each of said first Booth decoder cell structurally the each of same as said second Booth decoder cell except that at least one of a first plurality of transistors of said first Booth decoder cell is constructed to have a width greater than a width of a corresponding one of a second plurality of transistors of said second Booth decoder cell;

disposing at least one first Wallace tree cell and at least one first Booth decoder cell on said at least one critical path;

disposing at least one second Wallace tree cell and said at least one second Booth decoder cell are on an electrical path not said at least one critical path; and not disposing any second Wallace tree cell or any second Booth decoder cell on any of said at least one critical path.

6. A method of designing a parallel multiplier comprising the steps of:

providing a parallel multiplier core, wherein the step of providing a parallel multiplier core comprises the steps of:

providing a plurality of Booth encoder cells;

connecting a plurality of Booth decoder cells to at least one of said Booth encoder cells;

connecting a plurality of Wallace tree cells to at least one of said Booth decoder cells;

defining a predetermined amount of time greater than zero and less than a longest amount of time that it takes any electrical signal to travel from said input of said parallel multiplier core to said output of said parallel multiplier core;

defining at least one critical path within said parallel multiplier, said at least one critical path being an electrical path for which an amount of time that it takes for an electrical signal to travel from an input of said parallel multiplier core to an output of said parallel multiplier core is greater than or equal to said predetermined amount of time and less than said longest amount of time;

defining a first Wallace tree cell and a second Wallace tree cell, each of said first Wallace tree cell structurally the same as each of said second Wallace tree cell except that at least one of a first plurality of transistors of said first Wallace tree cell is constructed to have a width greater than a width of a corresponding one a second plurality of transistors of said second Wallace tree cell;

defining a first Booth decoder cell and a second Booth decoder cell, each of said first Booth decoder cell structurally the same as each of said second Booth decoder cell except that at least one of a first plurality of transistors of said first Booth decoder cell is constructed to have a width greater than a width of a corresponding one of a second plurality of transistors of said second Booth decoder cell;

disposing at least one first Wallace tree cell and at least one first Booth decoder cell on said at least one critical path;

disposing at least one second Wallace tree cell and at least one second Booth decoder cell are on an electrical path not said at least one critical path; and not disposing any second Wallace tree cell or any second Booth decoder on any of said at least one critical path.

* * * * *